(12) United States Patent
Favarolo et al.

(10) Patent No.: US 10,742,313 B1
(45) Date of Patent: Aug. 11, 2020

(54) SYSTEM TO OPTIMIZE ALLOCATION AND USAGE OF RESOURCES, GOODS, AND SERVICES AMONG NODES IN A CLUSTER OF NODES AND A METHOD FOR THE OPTIMAL AND TRANSPARENT EXCHANGE OF RESOURCES, GOODS, AND SERVICES AMONG NODES IN A CLUSTER OF NODES

(71) Applicants: Diego Favarolo, San Jose, CA (US); Adolfo Nemirovsky, San Jose, CA (US)

(72) Inventors: Diego Favarolo, San Jose, CA (US); Adolfo Nemirovsky, San Jose, CA (US)

(*) Notice: Subject to any disclaimer, the term of this patent is extended or adjusted under 35 U.S.C. 154(b) by 0 days.

(21) Appl. No.: 16/052,503

(22) Filed: Aug. 1, 2018

Related U.S. Application Data

(60) Provisional application No. 62/540,048, filed on Aug. 1, 2017.

(51) Int. Cl.
| | |
|---|---|
| *G06F 9/50* | (2006.01) |
| *H04B 7/185* | (2006.01) |
| *H04L 9/32* | (2006.01) |
| *H04L 29/08* | (2006.01) |

(52) U.S. Cl.
CPC ......... *H04B 7/18578* (2013.01); *G06F 9/505* (2013.01); *H04L 9/3236* (2013.01); *H04L 67/1012* (2013.01); *H04L 67/1078* (2013.01); *G06F 2209/503* (2013.01); *G06F 2209/505* (2013.01); *H04L 2209/38* (2013.01)

(58) Field of Classification Search
CPC ...................................................... G06F 9/505
See application file for complete search history.

(56) References Cited

U.S. PATENT DOCUMENTS

| | | | | |
|---|---|---|---|---|
| 2010/0153771 | A1* | 6/2010 | Gordon | G05B 19/4185 714/4.1 |
| 2015/0350345 | A1* | 12/2015 | Hashimoto | H04L 61/2069 709/219 |

* cited by examiner

*Primary Examiner* — Charlie Sun
(74) *Attorney, Agent, or Firm* — Plager Schack LLP; Mark H. Plager; Stephen Hallberg

(57) ABSTRACT

A system and a method are disclosed to optimize use of resources and services among a number of nodes, which could be software programs, individuals, machines, organizations or any entity that can exchange resources, goods and services with other entities. Platform not just facilitates exchange and sharing of resources and services, but also lower substantially legal cost and time for short or long term cooperation among entities.

9 Claims, 10 Drawing Sheets

| Node/Capacity | ΔT1 REQ'D | BALANCE | SHARE | ΔT2 REQ'D | BALANCE | SHARE | ΔT3 REQ'D | BALANCE | SHARE | ΔT4 REQ'D | BALANCE | SHARE | ΔT5 REQ'D | BALANCE | SHARE | ΔT6 REQ'D | BALANCE | SHARE |
|---|---|---|---|---|---|---|---|---|---|---|---|---|---|---|---|---|---|---|
| NODE 1 (N1) 600 TFlps | 200 | 400 | 400 | 300 | 300 | 0 | 1200 | -600 | -600 | 1100 | -500 | -500 | 1300 | -700 | -100 | 1200 | -600 | -500 |
| NODE 2 (N2) 1200 TFlps | 1000 | 200 | 200 | 600 | 600 | 500 | 1500 | -300 | -300 | 1800 | -800 | -800 | 2100 | -900 | -900 | 2400 | -1200 | -1200 |
| NODE 3 (N3) 1800 TFlps | 2500 | -700 | -600 | 2300 | -500 | -500 | 500 | 1300 | 900 | 200 | 1600 | 1300 | 800 | 1000 | 1000 | 100 | 1700 | 1700 |

1300

SYSTEM TO OPTIMIZE ALLOCATION AND USAGE OF RESOURCES, GOODS, AND SERVICES AMONG NODES IN A CLUSTER OF NODES AND A METHOD FOR THE OPTIMAL AND TRANSPARENT EXCHANGE OF RESOURCES, GOODS, AND SERVICES AMONG NODES IN A CLUSTER OF NODES

CLAIM OF BENEFIT TO PRIOR APPLICATION

This application claims benefit to U.S. Provisional Patent Application 62/540,048, entitled "System and method for optimal and transparent exchange of resources, goods and services among nodes of a cluster or value chain," filed Aug. 1, 2017. The U.S. Provisional Patent Application 62/540,048 is incorporated herein by reference.

BACKGROUND

Embodiments of the invention described in this specification relate generally to value chain resource allocation and provisioning of goods and services, and more particularly, to a system to optimize allocation and usage of resources, goods, and services among nodes in a cluster of nodes and a method for optimal and transparent exchange of resources, goods, and services among nodes in a cluster of nodes (e.g., nodes in a value chain) and for managing smart contracts between interested parties.

There are several problems with the current state of art of space data communication and services which render applications and systems expensive, complex, and inefficient. One specific problem is that current space data communication typically involves outdated or inefficient communication. For instance, there has been accelerated growth of Cube Satellite (CubeSat) deployment to Low Earth Orbit in the last few years. CubeSats have typically been built by industry/academia/government efforts for both, scientific research, and educational purposes. Most spacecraft for scientific use carry some type of scientific instrumentation or sensors, collect data, and store the data until it can be transmitted to a ground station. Such spacecraft have used, to a large extent, amateur radio communication technology (i.e., frequency allocation and protocols). However, the communications protocols currently in use are outdated and inefficient. Additionally, the use of outdated/inefficient communication technology is exacerbated by typical deployments which generally only include a single ground station per aircraft (instead of a network of distributed base stations). Similarly, large space missions mainly use standard internet communication protocols which, in many instances are inappropriate for conditions in space (and also inappropriate for ground-space communication).

Compatibility is another specific problem because current space data communication and service delivery employs multiple technologies that are not generally able to provide services and resources to and accept services and resources from other systems, and to use services exchanged to effectively inter-operate. For example, many high-end systems in space missions can only communicate with similar systems or have proprietary data formats unreadable by others, incompatible communications paths (non-compatible frequencies, equipment and signaling), differing/incompatible radio system coverage, etc. In these cases, sharing information, resources, or services with incompatible units can be difficult, time consuming, and prone to errors. The lack of a uniform standard that applies across devices and networks means there is a lack of universally adopted semantics. Without a clear definition, a lot of opportunities for misunderstandings arise.

A satellite, for example, may only connect with a ground station while it is in line of sight, which is a very small percentage of its time in orbit, with many resources of the satellite or ground station idle most of the time. For example, the satellite could be capturing high definition pictures but is unable to send them to ground or other satellites for use or for processing.

Thus, the current approaches, which use mainly proprietary systems, protocols, software, etc., cannot achieve interoperability, fast scalability, and efficient use of resources. As a result of such inefficient communication and incompatibility of multiple technologies, markets become fragmented with high development costs, long times to deployment, inefficient use of resources and services, and lack of incentives for collaborative efforts, which thereby impede value dramatically and slow down value generation for users and providers of resources and services. In fact, it is not uncommon to find space systems with abundant resources and services but with poor rates of utilization.

Therefore, what is needed is a way to exchange and share resources and services between nodes of a cluster in a collaborative commons approach, while substantially lowering legal costs and time for short or long term cooperation among nodes and entities.

BRIEF DESCRIPTION

A novel system to optimize allocation and usage of resources, goods, and services among nodes in a cluster of nodes and a method for optimal and transparent exchange of resources, goods, and services among nodes in a cluster of nodes are disclosed. In some embodiments, the system includes a decentralized peer-to-peer value chain network of nodes that connect the cluster of nodes together. In some embodiments, the system includes a blockchain ledger that stores smart contracts between entities and transactions of exchanged resources, goods, and services. In some embodiments, the cluster of nodes includes a plurality of nodes in a value chain comprising software programs, individuals, machines, computing devices, organizations, and other entities that can exchange resources, goods, or services with other nodes in the value chain. In some embodiments, the system supports and is implemented on a space operating system (SOS) network that is deployed for the global space industry value chain. In some embodiments, the system manages smart contracts among involved node entities.

In some embodiments, the system includes a set of rules and policies that regulate an internal market, sharing of resources, and exchange of goods and services, inside the cluster, and the external exchange in markets outside of the cluster. In some embodiments, blockchain technology is used to implement rules and policies. In some embodiments, the rules and policies are defined at least in part by a collaborative commons community.

In some embodiments, the system assigns internal certificates of contribution to nodes when the nodes enter the network. In some embodiments, the internal certificates are used to exchange resources such as processing power, energy, communication, and storage. In some embodiments, the certificates can be implemented as exclusive cluster tokens that cannot be exchanged by other coins external to the cluster. In some embodiments, the certificates implemented as exclusive cluster tokens can be converted to other coins external to the cluster at some exchange value.

In some embodiments, the system includes a resource manager to optimally allocate resources, goods, and services between a plurality of nodes in the network. In some embodiments, the resource manager employs optimization criteria and uses the rules and policies to (i) maximize the use of resources, goods, and services of the system by sharing all (or as much as possible) non-utilized and/or underutilized resources of nodes, (ii) increase transactional transparency as much as possible, so that resource consumers and producers have (as close as possible) full information about exchanged goods and services, which may be implemented using blockchain technology, (iii) avoid cluster instabilities or collapses due to lack of certain resources, war prices, etc., and (iv) incentivize the growth of the cluster, that is, the incorporation of new nodes to the cluster bringing additional resources, providing additional goods and services. In some embodiments, the resource manager manages the optimal allocation of resources, goods, and services between the plurality of nodes in the network by way of a resource allocation table that is updated at defined time intervals.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
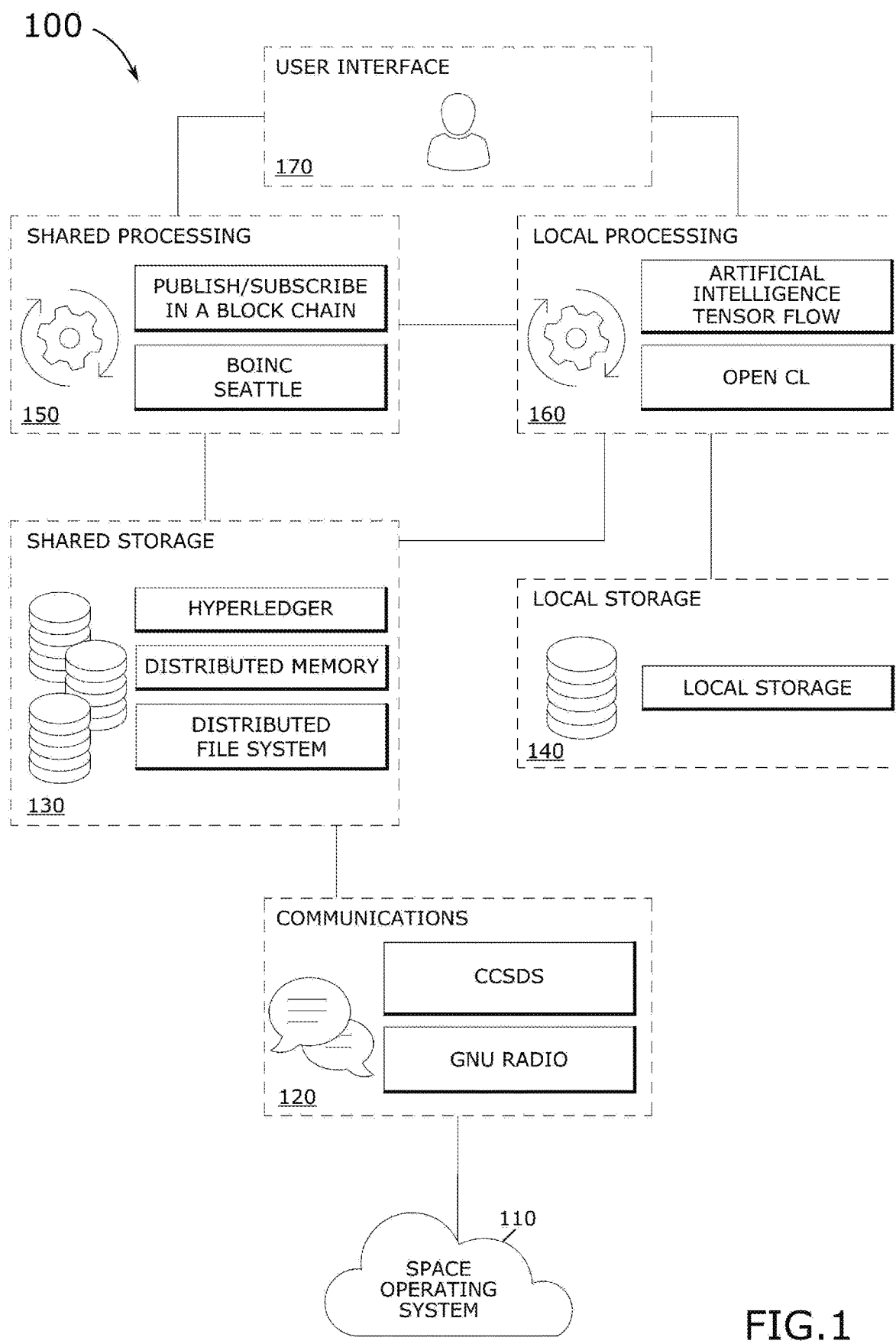
FIG. 1 conceptually illustrates a block diagram of a system to optimize allocation and usage of resources, goods, and services among nodes in a cluster of nodes in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel system to optimize allocation and usage of resources, goods, and services among nodes in a cluster of nodes and a method for optimal and transparent exchange of resources, goods, and services among nodes in a cluster of nodes. In some embodiments, the system to optimize allocation and usage of resources, goods, and services among nodes in a cluster of nodes includes a decentralized peer-to-peer value chain network of nodes that connect the cluster of nodes together. In some embodiments, the system to optimize allocation and usage of resources, goods, and services among nodes in a cluster of nodes includes a blockchain ledger that stores smart contracts between entities and transactions of exchanged resources, goods, and services. In some embodiments, the cluster of nodes includes a plurality of nodes in a value chain comprising software programs, individuals, machines, computing devices, organizations, and other entities that can exchange resources, goods, or services with other nodes in the value chain. In some embodiments, the system to optimize allocation and usage of resources, goods, and services among nodes in a cluster of nodes supports and is implemented on a space operating system (SOS) network that is deployed for the global space industry value chain. In some embodiments, the system to optimize allocation and usage of resources, goods, and services among nodes in a cluster of nodes manages smart contracts among involved node entities.

In some embodiments, the SOS network includes an operating system (i.e., space operating system, or SOS) that manages resources and services at nodes such as processing, storage, energy, etc., as well as communication with things (including robots and people). The SOS network itself is distributed across the cluster of nodes. In some embodiments, the SOS network is distributed across the cluster of nodes by a virtual machine implementation that allows individual nodes to be contemporaneously interconnected in the SOS network and viewed as a single interconnected entity, thereby allowing individual nodes to share and request resources or services from other individual nodes among the cluster of nodes. In some embodiments, the SOS network is implemented automatically (in some embodiments, by smart contracts) such that the cluster of nodes are enabled as a collaborative commons community that is organized according to governance rules of the commons.

In this specification, a value chain is defined as a linked set of activities that bring a product through the process of production and delivery to market. The global space or aerospace industry value chain is an example of a value chain widely used in this specification, but value chains in other industries are anticipated as appropriate for the features and functions of the subject matter disclosed in this specification.

Figure 4:
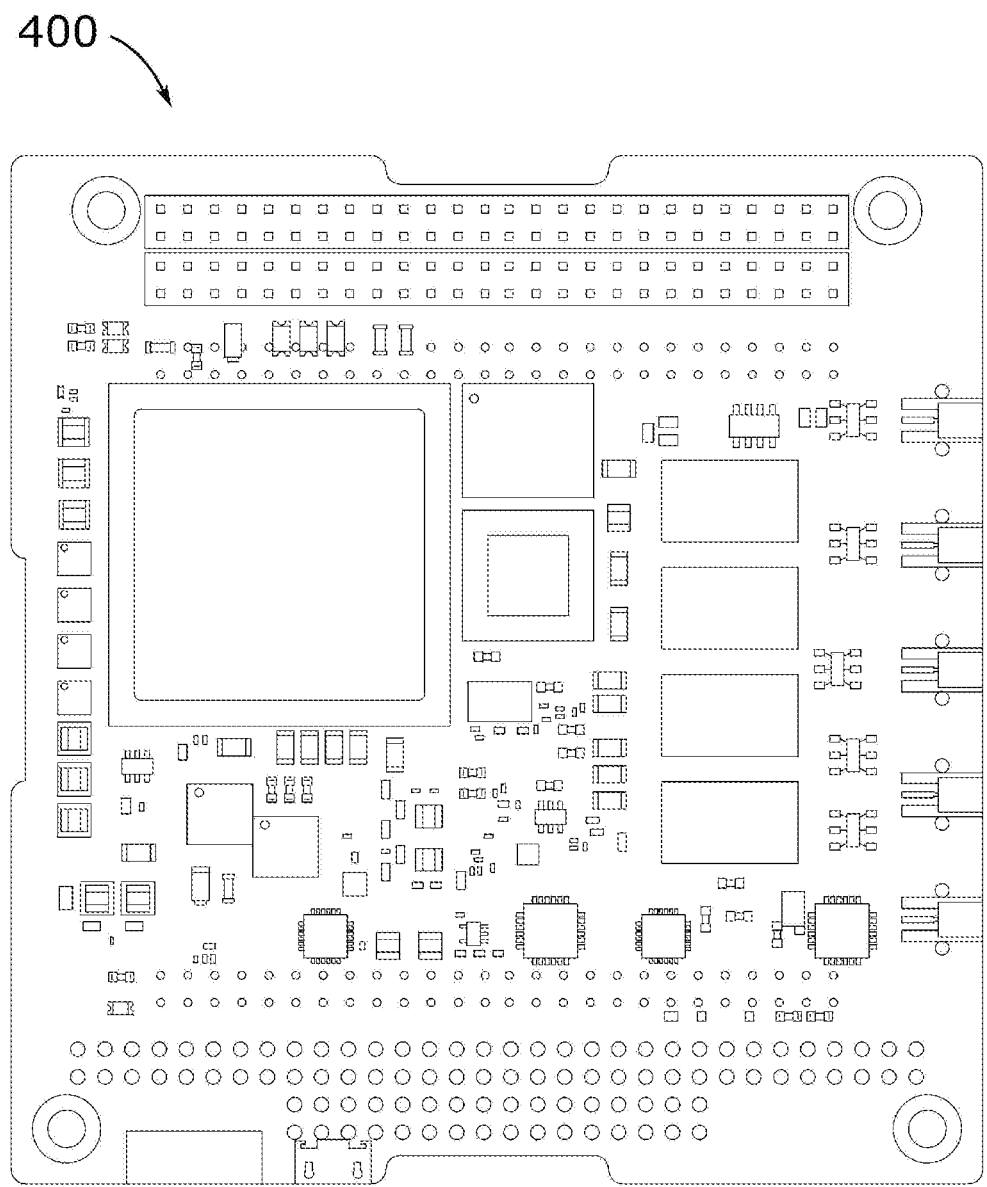
FIG. 4 conceptually illustrates a top hardware layer view of a physical node in some embodiments of the system to optimize allocation and usage of resources and services among nodes in a cluster of nodes.

Notwithstanding a preferred embodiment of a node that is described below by reference to FIG. 4, for purposes of this specification, nodes are defined as any one of or combination of software programs, individuals, machines, computing devices, organizations, and other entities that can exchange resources, goods, or services with other nodes in the value chain.

As stated above, there are several problems with the current state of art of space data communication and services which render applications and systems expensive, complex, and inefficient, and the existing approaches, which involve proprietary systems, protocols, software, etc., cannot achieve interoperability, fast scalability, and efficient use of resources, resulting in market fragmentation, high development costs and longer times to market, and reduced or non-existent incentives for collaborative efforts, and thus impeding value generation. Embodiments of the system to optimize allocation and usage of resources, goods, and services among nodes in a cluster of nodes and the method for optimal and transparent exchange of resources, goods, and services among nodes in a cluster of nodes described in this specification solve such problems by managing resource and service exchange, resource allocation, provisioning goods and services, etc., among involved nodes, and supporting smart contracts among involved parties.

In some embodiments, the system to optimize allocation and usage of resources, goods, and services among nodes in a cluster of nodes includes a set of rules and policies that regulate an internal market inside the cluster, and the external exchange in markets outside of the cluster. In some embodiments, blockchain technology is used to implement rules and policies. In some embodiments, the rules and policies are defined at least in part by a collaborative commons community.

In some embodiments, the system to optimize allocation and usage of resources, goods, and services among nodes in a cluster of nodes assigns internal certificates of contribution to nodes when the nodes enter the network. In some embodiments, the internal certificates are used to exchange resources such as processing power, energy, communication, and storage. In some embodiments, the certificates can be implemented as exclusive cluster tokens that cannot be exchanged by other tokens external to the cluster. In some embodiments, the certificates implemented as exclusive cluster tokens can be converted to other coins external to the cluster (e.g., "ETH" by Ethereum) at some exchange value.

For example, a system with various certificates (token in Ethereum and other blockchains) for various exchangeable resources, goods, and services may include a Token A, which could represent 1 megawatt (Mwatt or MWTT) of energy, a Token B, which could be 1 Mega FLOPS (floating point operations per second) provided by 1 hour of processing time, a Token C for another resource, etc. The Token A is exchanged for 2.5 units of cluster token, Token B for 0.4 units of cluster token. The value of a token (in terms of the cluster token) will, in general, change in time and may also differ at different geographies. In turn, the "external" token, is always exchangeable for Ethereum coins (ETH) and/or other coins at some value which may be changing in time. On the other hand, the internal tokens may have a value in terms of the cluster token, which could be represented in a table where, for example, Token A=2.5, Token B=0.4, and Token C=3.1. Furthermore, a cluster of nodes is expected to grow in time, that is, certain nodes will be leaving and some joining the cluster, with net positive influx of nodes and nodes, on average, will be expanding their resources and services. The growth of the cluster may accelerate after reaching some critical size. Additionally, it is possible that two or more clusters may join together to form one big cluster, keeping only one "external" token and using internal tokens for inter-cluster transactions (with new cluster being the addition of the two or more joined clusters).

In some embodiments, the system to optimize allocation and usage of resources, goods, and services among nodes in a cluster of nodes includes a resource manager to optimally allocate resources, goods, and services between a plurality of nodes in the network. In some embodiments, the resource manager employs optimization criteria and uses the rules and policies to (i) maximize the use of resources, goods, and services of the system by sharing all (or as much as possible) non-utilized and/or underutilized resources of nodes, (ii) increase transactional transparency as much as possible, so that resource consumers and producers have (as close as possible) full information about exchanged goods and services, which may be implemented using blockchain technology, (iii) avoid cluster instabilities or collapses due to lack of certain resources, war prices, etc., and (iv) incentivize the growth of the cluster, that is, the incorporation of new nodes to the cluster bringing additional resources, providing additional goods and services. In some embodiments, the resource manager manages the optimal allocation of resources, goods, and services between the plurality of nodes in the network by way of a resource allocation table that is updated at defined time intervals.

Embodiments of the system to optimize allocation and usage of resources, goods, and services among nodes in a cluster of nodes described in this specification differ from and improve upon currently existing options. In particular, the system to optimize allocation and usage of resources, goods, and services among nodes in a cluster of nodes greatly enhances the sharing of resources and services between distributed base station and satellite constellation systems, both among themselves and with a growing network of fixed and mobile users and providers of various resources and services (such as processing, storage, communication, and energy). In contrast, the existing systems and methods (or the current approaches) use resources and services inefficiently, resulting in high costs which is a hurdle that prevents many players from using existing space resources and/or services.

In addition, some embodiments of the system to optimize allocation and usage of resources, goods, and services among nodes in a cluster of nodes improve upon the currently existing options by providing a platform that facilitates exchange and sharing of resources and services in a way that attempts to optimize allocation and usage and which substantially lowers legal costs and time for short or long term cooperation among entities.

The system to optimize allocation and usage of resources, goods, and services among nodes in a cluster of nodes of the present disclosure may be comprised of the following elements. This list of possible constituent elements is intended to be exemplary only and it is not intended that this list be used to limit the system to optimize allocation and usage of resources, goods, and services among nodes in a cluster of nodes of the present application to just these elements. Persons having ordinary skill in the art relevant to the present disclosure may understand there to be equivalent elements that may be substituted within the present disclosure without changing the essential function or operation of the system to optimize allocation and usage of resources, goods, and services among nodes in a cluster of nodes.

1. Distributed operating system with distributed and scalable storage, a processing grid, and virtual network, shared communication capabilities. The distributed operating system in some embodiments is a space operating system (SOS).

2. Blockchain technology that is used to build a distributed smart system of nodes, providers and consumers, which transparently exchange resources and services such as processing, communication, storage, energy, etc. In some embodiments, the distributed smart system of nodes form as a decentralized peer-to-peer value chain network of nodes. In some embodiments, the decentralized peer-to-peer value chain network of nodes is a space operating system (SOS) network.

3. The operating system (i.e., space operating system, or SOS) manages resources and services at nodes such as processing, storage, energy, etc., as well as communication with things (including robots and people).

4. Nodes can be owned by non-governmental organizations (NGOs), public or private entities, and individuals or groups of individuals who may associate for a short time just to complete a specific project (e.g., by using smart contracts) or for an extended period of time in order to build a new company.

5. Exchange of resources and services among nodes are quantified according to time-based units of resource measurement formulations (i.e., resource/service per unit of time) and are used to characterize (to certain modeling accuracy) key resources or services per unit time exchanged in the network. The unit measurements are denoted in tokens for each type of resource. The tokens include TFLP for a processing resource (1 Teraflop processing power per 1 second of time), TBS for a communication resource (1 Terabit of data communication per 1 second of time), and KWTT for a power resource (1 kilo Joule of energy per 1 second of time).

6. Certificates (internal tokens) are issued to the nodes for the amount of shared resources or services provided.

7. There is no arbitrary limit on amount of tokens in the system as the network is expected to grow unlimited (in transactions per node and number of nodes), with token reflecting this unbounded growth of the network's transactions.

8. All internal tokens have, at a given time, a certain exchange value in the system token that is used to exchange value (resources, goods, and services) with external nodes, people, or entities.

9. The distributed operating system (space operating system, or SOS) enables a community, organized according to governance rules agreed to in advance and generally implemented automatically (in some embodiments, as smart contracts) capable of modification through member consensus.

10. An API layer of the distributed operating system (space operating system, or SOS) provides access to communication space protocols such as CubeSat Space Protocol ("CubeSat", which is described further below) and the Consultative Committee for Space Data Systems ("CCSDS", which is described further below), and other additional open source functionalities such as artificial intelligence (AI) and other useful libraries to build space applications.

11. Nodes of the SOS ecosystem (resources and services, producers and consumers) include suppliers and consumers of resources for space communications, the resources including, for example, processing power, communications, memory storage, optical subsystems, etc.

The Consultative Committee for Space Data Systems (hereinafter also referred to as the "CCSDS") is a body composed of the major space agencies and industrial aerospace entities of the world. The CCSDS was established in 1982 with the objective of providing a forum for discussion of common problems in the development and operation of space data systems.

The Space Internetworking Services Area (hereinafter also referred to as the "SIS") supports the work of the CCSDS by providing services and protocols to address networked interactions of many forms, such as interactions between spacecraft and earth-based resources (ground stations), among spacecraft, between spacecraft and landed elements, and within heterogeneous spacecraft. The SIS Area provides communication services and protocols independent of specific link technology and independent of application-specific semantics. This basically includes the network through application layers of the OSI reference model. The SIS Area accommodates all ranges of delay, interactivity, and directionality, although not all protocols are appropriate for all environments.

To make the system to optimize allocation and usage of resources, goods, and services among nodes in a cluster of nodes of the present disclosure, one may implement the items from #1-9 above for a generic system, and items from #1-11 above for specific application to the space industry value chain. By way of example, FIG. 1 conceptually illustrates a block diagram of a system to optimize allocation and usage of resources, goods, and services among nodes in a cluster of nodes in a space industry value chain 100 (in this example, referred to as "space industry value chain system 100"). As shown in this figure, the space industry value chain system 100 includes a space operating system (SOS) 110, communications 120, shared storage 130, local storage 140, shared processing 150, local processing 160, and a user interface 170. In this example, a node is performing processing, storage, and communication using both local and shared resources and services, which are managed by the space operating system (SOS) 110. The communications 120 shown in this figure include communications conforming to the standard of communications of the Consultative Committee for Space Data Systems (CCSDS) and GNU radio communications, but other communications may be included. The shared storage 130 shown in this figure includes a Hyperledger blockchain implementation, but other blockchains, such as Ethereum could be used instead of, or in combination with Hyperledger blockchain. The shared storage 130 also includes a distributed file system and distributed memory, but other shared storage may be included in other embodiments. The shared processing 150 shown in this figure includes processing to publish in or subscribe to a blockchain (e.g, Hyperledger blockchain) and an entity-specific processing resource by BOINC, but other shared processing may be included. The local processing 160 includes an artificial intelligence implementation of Tensor Flow, but other artificial intelligence offerings could be used instead of, or in combination with Tensor Flow, such as Open AI. The local processing 160 also includes Open CL. A person of ordinary skill in the art would appreciate that any and all of the elements of the space industry value chain system 100 may improve or advance through development, change between similar offerings, or otherwise alter the makeup of the space industry value chain system 100 shown in this figure without changing the functional purpose of the system to optimize allocation and usage of resources, goods, and services among nodes in a cluster of nodes in a space industry value chain 100.

Figure 2:
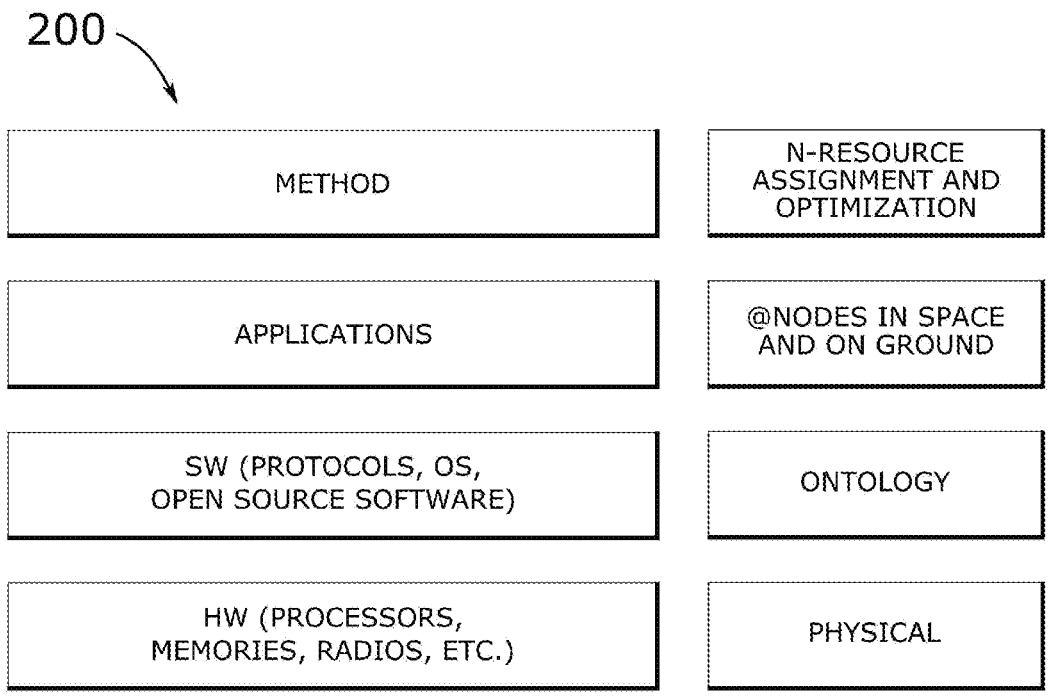
FIG. 2 conceptually illustrates an architecture of the system to optimize allocation and usage of resources, goods, and services among nodes in a cluster of nodes in some embodiments.

Turning now to another example, FIG. 2 conceptually illustrates an architecture 200 of the system to optimize allocation and usage of resources, goods, and services among nodes in a cluster of nodes. The architecture 200 shown in this figure illustrates an implementation of the system to optimize allocation and usage of resources, goods, and services among nodes in a cluster of nodes. In particular, an application layer is built on top of the physical (hardware) and software layers. For example, an application could be intended for sending partially processed images from a CubeSat node to ground station nodes. The application runs on the node on the space operating system (SOS) using local and shared (HW & SW) resources and services such as CPUs, GPUs, sensors, OS, distributed databases, communications, etc. The node at CubeSat in general is using its resources (e.g., local processing power) intermittently. In some embodiments, the method for optimal and transparent exchange of resources, goods, and services among nodes in a cluster of nodes (which is described in greater detail below, by reference to FIG. 5) is performed to optimize use of resources of the system to optimize allocation and usage of resources, goods, and services among nodes in a cluster of nodes with nodes sharing idle resources with other nodes in the cluster that have scarcity of resources during certain time intervals (e.g., every 10 minutes).

Figure 3:
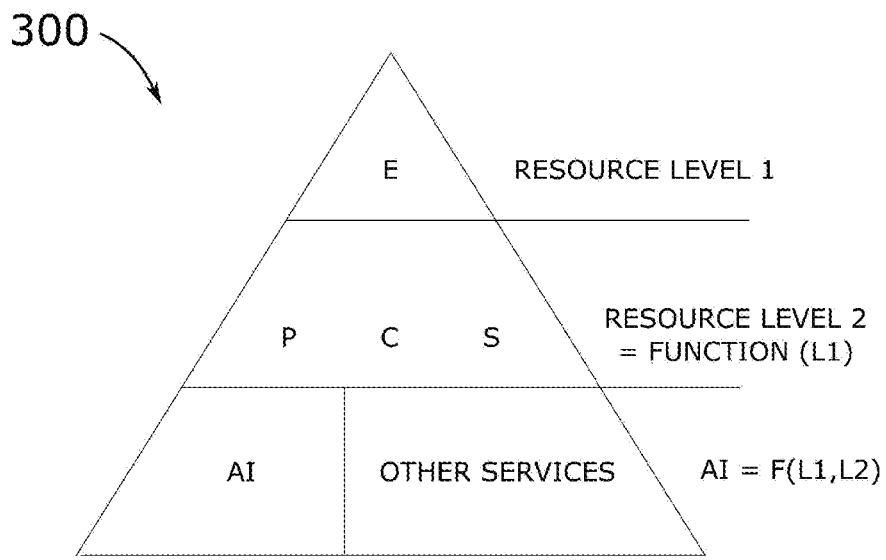
FIG. 3 conceptually illustrates a hierarchy of resources shared among and used by nodes in some embodiments of the system to optimize allocation and usage of resources and services among nodes in a cluster of nodes.

By way of example, FIG. 3 conceptually illustrates a hierarchy of resources 300 shared among and used by nodes of the system to optimize allocation and usage of resources and services among nodes in a cluster of nodes. The hierarchy of resources 300 shown in this figure include different types of resources which could be leveraged for use by any of several nodes in a cluster defined for a particular value chain (e.g., in an industry, such as the space and aerospace industry). The resources shown in this hierarchy of resources 300 include energy (E), processing (P), communication (C), storage (S), and artificial intelligence processing (AI). The resources are classified in levels that form a pyramid which conveys a hierarchical nature of resource cost dependencies. For example, E is at the top level (level 1), P, C, and S are at level 2 as their "cost" depends on E, and AI and other resources, in turn, are at level 3 because they depend on other (level 2) resources such as P, C, and S, etc.

Figure 6:
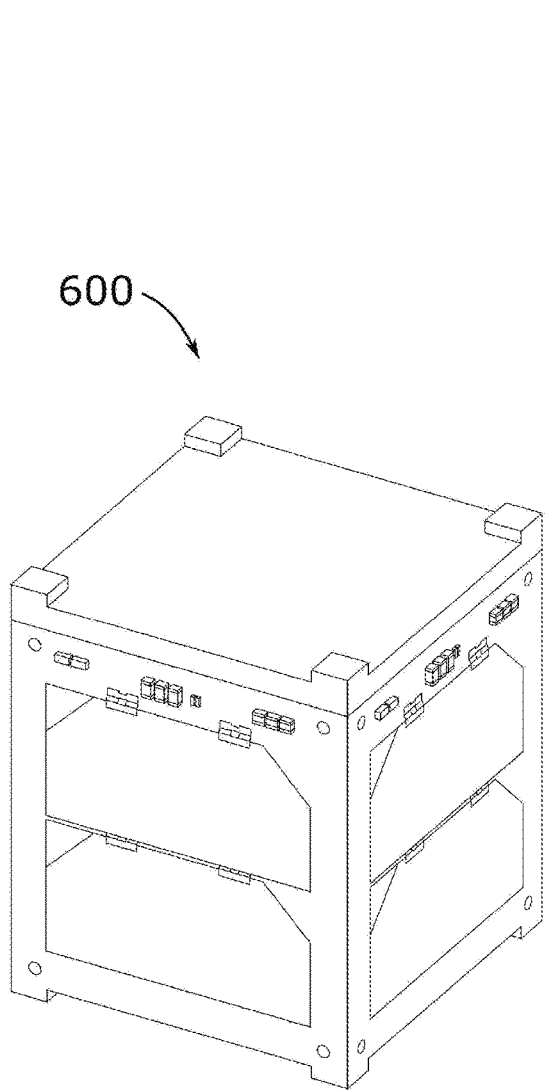
FIG. 6 conceptually illustrates an example of node deployment in an SAI 1U form factor in some embodiments.
Figure 7:
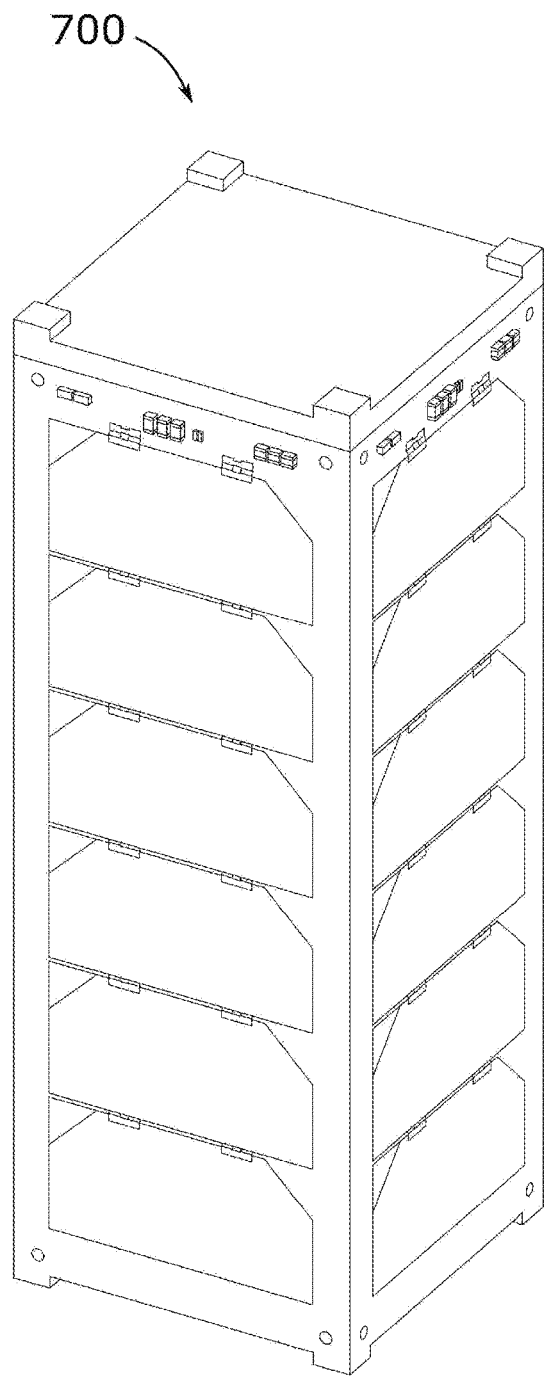
FIG. 7 conceptually illustrates an example of node deployment in an SAI 3U form factor in some embodiments.

While FIGS. 1-3 have illustrated conceptual aspects of the system to optimize allocation and usage of resources and services among nodes in a cluster of nodes, nodes of the system to optimize allocation and usage of resources and services among nodes in a cluster of nodes have physical hardware. In the next example, a preferred embodiment of a node is conceptually illustrated in FIG. 4 at a physical hardware component level (hereinafter referred to as the "physical hardware node 400"). As shown in this figure, the physical hardware node 400 includes several components and devices, such as processors, communication, sensors, and memory chips. The physical hardware node 400 shown in this example can be deployed for satellite or ground stations. In some embodiments, the physical hardware node 400 includes an antenna for communication. In some embodiments, the antenna is a low consumption, nano-capacitive antenna that enables high-powered communication between multiple space satellite nodes, between multiple ground station nodes, and between a space satellite node and a ground station node. In some embodiments, the physical hardware node 400 is connected with one or more optional boards that can be included for high computing power with a supercomputer on a chip. In some embodiments, the physical hardware node 400 is connected with one or more alternative boards that add strong AI capabilities. For example, a board with Jetson TX chips. The physical hardware node 400 can be deployed in various form factors (e.g., SAI 1U, SAI 3U, etc.) and may be configured inside a box. An example of an SAI 1U form factor 600 is conceptually illustrated in FIG. 6, while another example of an SAI 3U form factor 700 is conceptually illustrated in FIG. 7.

Several of the examples described above pertain directly to the system to optimize allocation and usage of resources and services among nodes in a cluster of nodes. In some embodiments, the method for optimal and transparent exchange of resources, goods, and services among nodes in a cluster of nodes is performed to establish the distributed network, assign tokens to nodes entering the network, and then optimize resource and service allocation and usage between the nodes of the network. In some embodiments, the method for optimal and transparent exchange of resources, goods, and services among nodes in a cluster of nodes uses a blockchain ledger to manage resource and service transaction and a distributed resource manager to optimize the ongoing and dynamic allocation and usage of resources and services across the network. In some embodiments, the distributed network that is established by the method is the SOS network for a cluster of space industry nodes associated with a space industry value chain.

Figure 5:
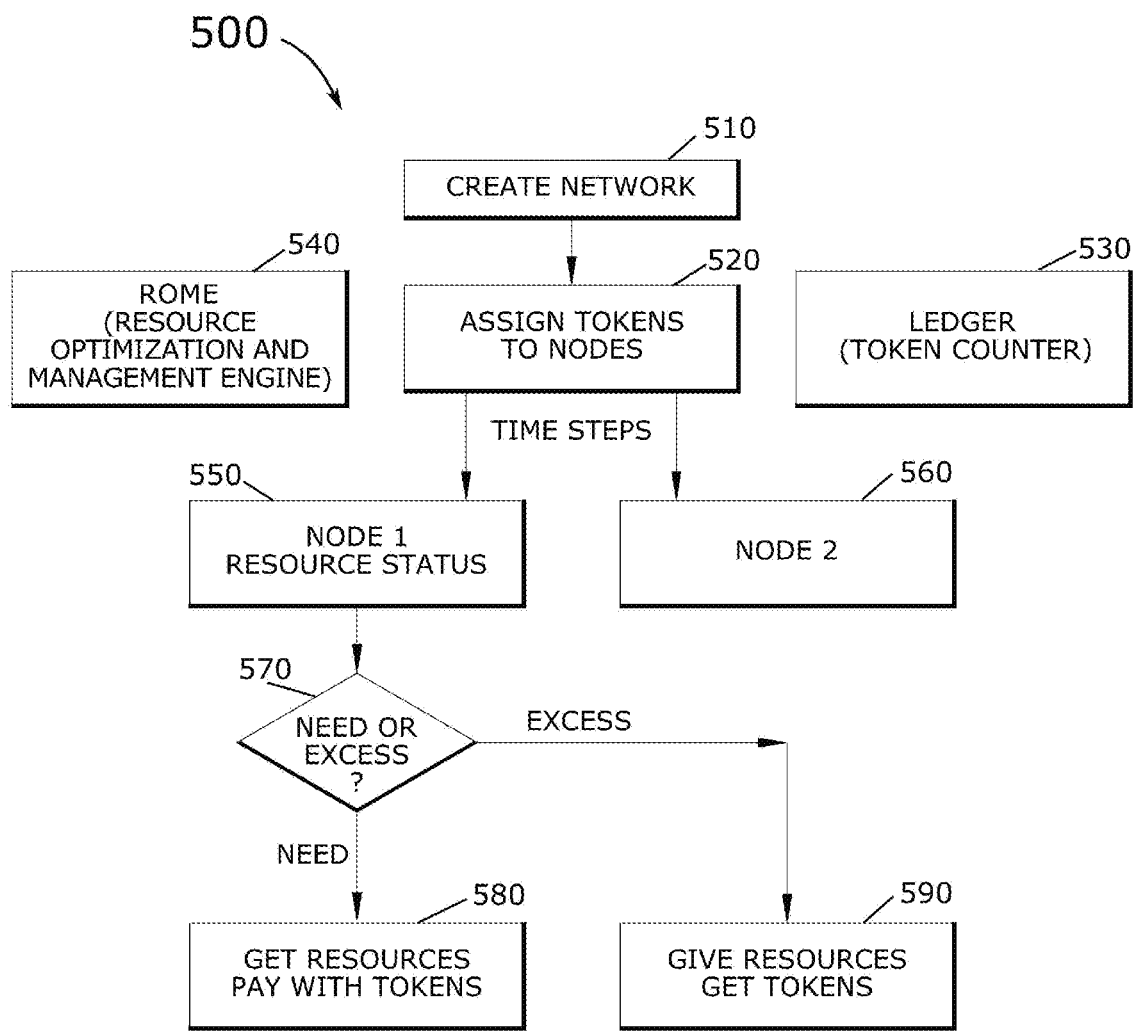
FIG. 5 conceptually illustrates a method for optimal and transparent exchange of resources, goods, and services among nodes in a cluster of nodes and management of smart contracts between interested parties in some embodiments.

By way of example, FIG. 5 conceptually illustrates a method for optimal and transparent exchange of resources, goods, and services among nodes in a cluster of nodes 500. As shown in this figure, the method for optimal and transparent exchange of resources, goods, and services among nodes in a cluster of nodes 500 starts by creating a network (at 510).

As noted above, the network may be created as a space operating system (SOS) network for a cluster of nodes associated with the space industry and used in relation to the space industry production value chain. Adding to this idea, a Distributed Intelligent Entity (DIE) is a computer program, running on a peer-to-peer network, incorporating governance and decision-making rules to the network. That is, code is provided for direct, real-time control of the SOS network and its funds. DIE were made possible by the development public blockchain platforms, like Hyperledger and Ethereum, which provide a decentralized virtual machine to execute peer-to-peer contracts using native coins (e.g., ether).

Therefore, the SOS network is effectively a community, organized according to its governance rules agreed in advance and implemented in open source software, capable of modification through member consensus. The Collective Commons of the DIE selects the desired end-goals (and conditions for achieving these goals), which are implemented as contracts and rules. The Collaborative Commons logic, integrated in the Open Space Network's DIE, includes sharing (as a key factor of wealth production), abundance (an extensive pool of resources), a near perfect market (with complete information for consumers and producers), and an economy of connected things including people and robots (in which there are new means of economic and wealth production that leverages Internet of Things and AI/Machine Learning)

The Space Operating System (SOS) uses blockchain to produce a public ledger of the SOS network transactions. The SOS executes the logic (policies and rules) defined by the DIE, and integrates other technologies (e.g. space data protocols and open source libraries) in order to provide a wide range of services, including storage, communication, scientific computing and AI libraries. The SOS also includes a distributed resource manager for node's resources and services such as processing power, storage, communication, energy, etc., which are exchanged by nodes of the cluster. The distributed resource/service manager matches the request of resources or services by a node with supply from other nodes, then required resources or services are provided to requester node by provider nodes powered by token exchange. The resource/service manager implements certificate emission policies to guarantee the dynamic equilibrium of the system to optimize allocation and usage of resources, goods, and services among nodes in a cluster of nodes and allow for its autonomous growth.

Members in the SOS network include suppliers and consumers (also referred to as "prosumers" for being both suppliers and consumers) of resources and services for space communications, where the resources typically include processing power, communications, memory storage, optical subsystems, etc. A typical node is both, producer and consumer of resources (otherwise referred to as "prosumer"), such as processing. For example, at some time the node has an excess of processing resources, and at later time the same node may have a need for additional processing capability. It is expected that these resources and services would be mainly consumed by distributed base stations and satellite constellations but there will be other interested parties (producers and consumers) developing a wide variety of projects.

The SOS nodes share, in a peer-to-peer mode, their open source software and hardware resources (CPU, memory, communication and sensors among others). When a node joins the network it makes a promise to share its resources and in return receives a certain amount of certificates. These certificates are issued by the SOS and granted to the node. Nodes will usually have one or more capabilities. Examples of such node capabilities include, without limitation, geo-referenced overlay network, basic navigation sensors, accelerometer, altimeter, geolocalization, gyroscope, magnetometer, cameras, lidars, radars, ultrasound, etc.

The SOS uses an n-component resource and services array to account for use, sharing and exchange of resources. Resources and services are exchanged among nodes at certain speed (resource/service per unit of time) and are used to characterize (to certain modeling accuracy) key resources or services per unit time exchanged in the distributed open space network, including processing, communication, and power, with their associated tokens: TFLP, TBS and KWTT.

By way of example, TFLP tokens denote Processing Power per Unit Time (e.g., 1 TeraFlop/s=1 trillion floating operations per second), KWTT tokens denote Energy Transferred per Unit Time, which is power (e.g., 1 KWatt=1 thousand Joule/second, energy per unit time), and TBS tokens that denote Communication Speed (Tera Bits=1 trillion bits per second).

Other resources and services may be considered in the array, such as memory, and also higher granularity of resources could be included, for example, type of memory (RAM, storage, etc.) thus increasing the dimensionality of the array. Similarly, various types of processing resources may be of relevance in the cost model (e.g., CPU, GPU, quantum processing, etc.). Other IoT services may also be added such as various types of data from devices such as cameras or optical devices, sensors' data such as environmental monitoring data, etc. The "best" selection of resources and services to be included in the array will be defined by the DIE, to enable a robust sharing of resources and services (at proper abstraction level) at a fair price for consumers and providers to enable a vigorous and self-governing growth of the network.

In blockchain-based systems, when nodes are "mining" they are competing with each other to win coins by solving computational puzzles. The first transaction in a block is a special one which assigns digital coins to the creator of the block, adding an incentive for nodes to support the network. This also provides a way to introduce coins into circulation, since there is no central authority to issue them. The steady addition of a constant amount of new coins is analogous to gold miners expending resources to add gold to circulation.

In contrast the value creation in the SOS network is directly related to resource and services sharing and proceeds as follows: the issuance of tokens is determined by the policies of the DIE. This means that the emission function is executed in accordance with contracts of the network. The DIE understands the Proof of Work, POW, as a Certificate of Contribution of a node that accepts to provide resources and/or services to the system. Each time a node shares a resource or service with some requester node, the SOS grants a number of tokens equivalent to the amount of shared resources or services.

A major cornerstone of the SOS network is the theory of Collaborative Commons, which relies on information sharing. Sharing as a modality of economic production could be the basis for a new Economic/Monetary System, when shared goods are prevalent in the physical-capital base of an economy. Social sharing has become a highly widespread practice around the globe, e.g., more than one billion people are active Facebook users. Social sharing has grown more salient in the overall mix of relations of production in the economy and sharable physical goods have been in steep rise in recent years (e.g., platforms such as Airbnb, Uber, etc.).

Shareable goods of interest are those that systematically, though perhaps intermittently, have excess capacity, which by combining comparative transaction costs and motivation analysis, resource owners reach the conclusion that excess capacity may better be harnessed through sharing relations than through secondary markets. Some examples of early shareable goods are the creative labor (including open source software) and peer production.

Ethereum and other blockchain technology are key enablers of information, services and resource sharing. They not only provide powerful infrastructures for decentralized and autonomous contracts and rules but also bring incentives that propel the fast growth of the network of suppliers and consumers. Using a decentralized sharing economy of computing power, such as that of Golem Network, anyone with a computer at home could make money by sharing her computing powers. It is now possible to compute, in a decentralized and inexpensive way, renting out cycles as users can contribute resources in a simple and rewarding manner. Golem has an Ethereum-based transaction system that clears payments between providers, requestors and software developers. The SOS Network builds a strong platform for sharing more generalized resources and services such as processing power, storage, energy, etc. in the domain of space applications.

The DIE of the SOS Network implements the logic of the Collaborative Commons managing resources and services according to certain contracts and rules which regulate the supply of the total amount of certificates in circulation. There is no arbitrary total number or amount of tokens in the system, however, as the SOS network is expected to grow unlimited.

A Perfect Market is a fully transparent market in which buyers and sellers are so numerous and well informed that monopoly is absent and market prices cannot be manipulated. Therefore, a Collaborative Common Logic of SOS implemented by the DIE on a blockchain platform generates a near perfect market.

As such, the SOS greatly enhances the sharing of resources and services between distributed base station and satellite constellation systems, both among themselves, and with a growing network of fixed and mobile users and providers of various resources and services (such as processing, storage, communication, and energy). The SOS network is an open system with properties of self-organization, scalability and sustainability. Implementation of the SOS is based on a collaborative commons blockchain solution. The SOS enables a new collaborative commons—an open space economy—by sharply lowering costs and reducing, or eliminating barriers to develop global collaborative missions and projects leveraging extensive distributed ground and space resources and services. The SOS platform greatly empowers current collaborative efforts such as SETI searches (i.e., Seti@Home) and new planets discovery programs (e.g., Zooniverse). The SOS also enables collaborative low-cost space station missions and powerful new development with CubeSat Space Protocol (hereinafter also referred to as "CubeSat platform" or "CubeSat"), among others.

The CubeSat Space Protocol enables distributed embedded systems to deploy service-oriented network architecture with similar layers as the TCP/IP model. The CubeSat platform implementation supports a connection oriented transport protocol (Layer 4), a router-core (Layer 3), and several network-interfaces (Layer 1-2). A service-oriented architecture eases the design of satellite subsystems, since the communication bus itself is the interface to other subsystems. This means that each subsystem developer only needs to define a service-contract, and a set of port-numbers on which the system will be responding. Furthermore, subsystem inter-dependencies are reduced by CubeSat, and redundancy is easily added by adding multiple similar nodes to the communication bus. Additionally, the Space Assigned Numbers Authority ("SANA") is the registrar function for the protocol registries created under the Consultative Committee for Space Data Systems (CCSDS). SANA has been inspired in the Internet Assigned Numbers Authority (IANA, iana.org), and is used by the SOS.

In some embodiments, the SOS includes a distributed, robust, and scalable global storage, a processing grid, and a virtual network superimposed on the application layer, hence conforming to a completely decentralized and autonomous system that also allows for shared communication capabilities. It is a peer-to-peer overlay network that leverages Ethereum [ETH] (another peer-to-peer network) and/or other blockchain technologies to build a distributed smart system of prosumers (providers and consumers) that transparently exchange resources and services such as processing, communication, storage, energy, etc. For example, a node could be a provider of processing resource for certain time that has excess processing, while a consumer when in need, at a different time.

Disparate space data networks should not be viewed as a communication interoperability problem but as an integration opportunity to empower devices and applications to join a network benefiting from their collective use. The SOS allows transparent resource and service sharing, thereby turning a node in the SOS network into an asset that increases its value as more nodes and/or devices join the network. Every new device incorporated in the SOS network contributes by adding and using extra resources and/or services of the nodes in the system, causing an exponential growth of resources and services shared and/or consumed. The SOS provides incentives in token for nodes to join the network and for nodes already in the network to increase their sharing of services and resources.

Turning back to FIG. 5, after creating the SOS (at 510), the method for optimal and transparent exchange of resources, goods, and services among nodes in a cluster of nodes 500 assigns tokens to nodes (at 520). In some embodiments, the tokens assigned by the method for optimal and transparent exchange of resources, goods, and services among nodes in a cluster of nodes 500 are certificates of contribution (or CCs). In some embodiments, the SOS encourages sharing of resources and services by issuing certificates, CC (i.e., tokens in Ethereum) to the nodes for the amount of shared resources or services provided by each node. For example, processing power can be measured in teraflops (Tflops), and a certificate of contribution can be defined as TFLP=1 Tflops ($10^9$ floating point operations per second)×1 second=1 Tflops×1 sec. Thus, when the method for optimal and transparent exchange of resources, goods, and services among nodes in a cluster of nodes 500 assigns certificate tokens to nodes (at 520), each node gets assigned a certain number of CCs (e.g., 10,000 TFLP) at the time of instantiation (time=0) based on their relative potential contribution of resources to the SOS network. The number 10,000 is just an example, of course, but a general initial issuance of CCs might be the equivalent to about 3 days of processing of the node. In that case, the actual processor speed would be needed for calculation of the shared resource provided by the node and then the initial issuance of CCs for a node with processing power resource would be calculated based on the total processing capacity of the node.

The assignment of certifications (CCs) for contributions of resources is, therefore, similar to Proof of Work (POW) in most peer-to-peer networks based on blockchain technology, with the difference being that in these systems, tokens are assigned for completed solutions to mathematical problems, while in the SOS network, resources or services provide concrete value exchanged between supplier nodes and requester nodes. The abundance of resources and services and their sharing is accomplished by incentives which lead to a virtuous cycle with positive feedback loops inducing an exponential growth of the network. This is a characteristic of collaborative commons and may lead to self-organized, distributed organizational systems. This dynamic is in fact connected to the governance of the organization, and its related rule and policies. The SOS leverages advances in the theory and practice of collaborative commons to propose policies/governance rules to enhance the self-organization and sustainability of the system. The distributed nature of the SOS network and the transparency of transactions for exchanging nodes' resources or services is enabled by blockchain technology and produces a (near) perfect market (i.e., full information for consumers and producers).

As shown again in FIG. 5, a blockchain ledger is present for assignment of tokens, or rather assigned certificate (or token) count (at 530) for each node, and for any transactions in which certificates are exchanged between nodes for the sharing of a resource or service by one node and usage of the resource or service by another node.

Also shown in FIG. 5 is a distributed resource optimization and management engine (hereinafter referred to as "ROME" or "resource manager"). In some embodiments, the method for optimal and transparent exchange of resources, goods, and services among nodes in a cluster of nodes 500 calls the resource manager (ROME) 540 when a distributed application requires more resources to run on a particular node, such that the resource manager (ROME) 540 can identify optimal resources for the exchange of certifications for the needed resources. Distributed applications run on the SOS. Each node is an entry point to the network. In some embodiments, when a node requires certain computing resources to run a particular application, the node shares the resource requirements with the SOS network in a peer-to-peer scheme and also approves the use of a certain amount of tokens (allowance of certificates) to the SOS. The SOS evaluates the used computing resources from contributing nodes that ran the application and takes CCs (tokens) from the requester node to pay executing nodes at job completion. When a new task is entered into the SOS, it does not make a mass broadcast but instead the request is entered into Hyperledger (or another blockchain) which has automatic mechanism to inform the nodes that could execute the tasks.

This is demonstrated by the method for optimal and transparent exchange of resources, goods, and services among nodes in a cluster of nodes 500 in FIG. 5. Specifically, after the method for optimal and transparent exchange of resources, goods, and services among nodes in a cluster of nodes 500 assigns CCs (at 520), it goes into a time-step repeating loop where it determines whether a node needs a resource or service, or has an excess resource or service to share. In this example, Node 1 and Node 2 have been assigned CCs (at 520) by the method for optimal and transparent exchange of resources, goods, and services among nodes in a cluster of nodes 500, and a resource status is provided (at 550) by Node 1 presently, while Node 2 stands by (at 560). Thus, the method for optimal and transparent exchange of resources, goods, and services among nodes in a cluster of nodes 500 determines (at 570) whether Node 1 needs more resources or services or has excess resources or services to share. When Node 1 needs more resources or services, the method for optimal and transparent exchange of resources, goods, and services among nodes in a cluster of nodes 500 gets (at 580) the resources via the resource manager (ROME) 540 and pays for the resources with token certificates at the rate defined by the unit of measure for the resource. On the other hand, when Node 1 does not need more resources or services, but rather, has excess resources and/or services to share, then the method for optimal and transparent exchange of resources, goods, and services among nodes in a cluster of nodes 500 gives (at 590) or provides the resources to the node in need and gets token certificates in return from the node in need.

In some embodiments, the distributed resource manager (ROME) 540 is instrumental in managing the overall resource and service allocation. In particular, the resource manager (ROME) 540 generates a table at every time step (every iteration of the repeated loop of the method 500) with resource and service allocation and defines redistribution to share resources and services between the nodes of the SOS network. In this way, the Space Operating System (SOS) of the network is able to manage resources and services at nodes (resources such as processing, storage, energy, etc.) as well as communication with things (including robots and people). The SOS API layer gives access to communication space protocols and other additional open source functionalities to build space applications such as artificial intelligence and other useful libraries.

To use the system to optimize allocation and usage of resources, goods, and services among nodes in a cluster of nodes of the present disclosure, software (a user interface or software application) is available to allow users to either create or join to a sharing platform along some specific value chain (such as space industry).

Figure 8:
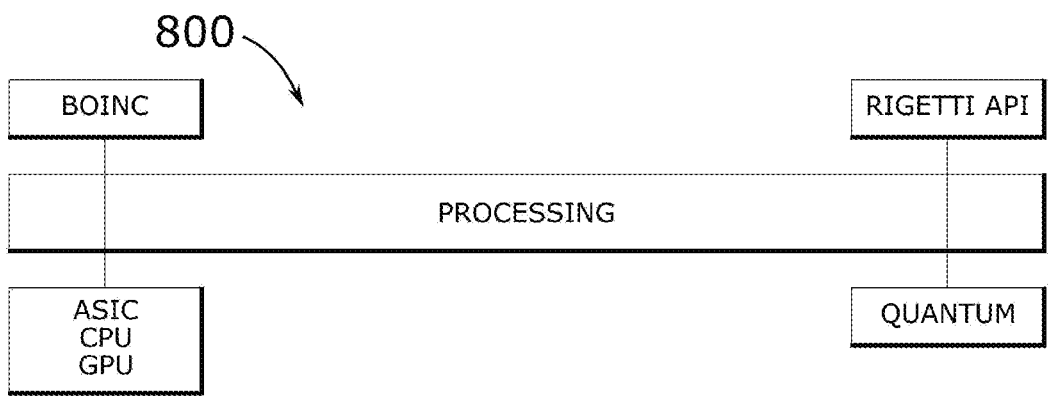
FIG. 8 conceptually illustrates a processing resource block diagram that demonstrates usage of the local and shared processing resources to run software and middleware in some embodiments.

By way of example, FIG. 8 conceptually illustrates a processing resource block diagram 800 that demonstrates usage of the local and shared processing resources to run software and middleware, such as BOINC, which is an open-source software platform for distributed computing using volunteered resources, or Rigetti API, which provides cloud access to quantum computer processors. The processing resource block diagram 800 also shows that other hardware resources may reside in the node (e.g., CPUs, GPUs, ASICs, etc.) or are virtual and are accessed via certain APIs (e.g., Rigetti API, among other cloud accessible processing resources).

Figure 9:
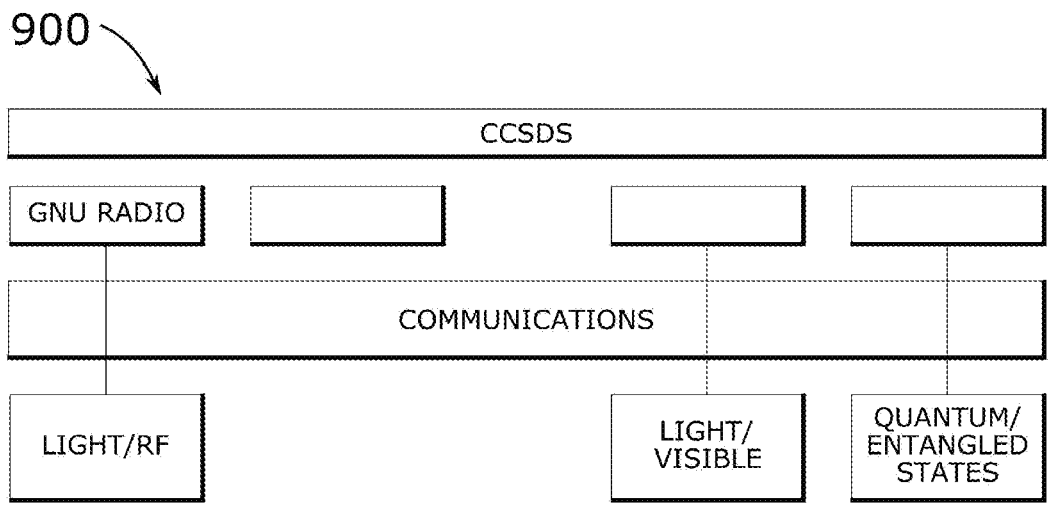
FIG. 9 conceptually illustrates a communications resource block diagram that demonstrates data communications enabled by physical components, elements, or phenomena such as light, entangled photons or electrons for quantum communications with high level software running on nodes in some embodiments.

Turning to another example, FIG. 9 conceptually illustrates a communications resource block diagram 900 that demonstrates data communications enabled by physical components, elements, or phenomena such as light (e.g., visible light, radio frequency, etc.), entangled photons or electrons for quantum communications, etc. The communications resource block diagram 900 also shows high level software running on nodes, including software defined radio (SDR) such as GNU radio, and CCSDS, which is a standard for communications in space defined by the Consultative Committee for Space Data Systems and widely adopted by space agencies and aerospace companies around the world, as well as other software running on nodes of the cluster of nodes.

Figure 10:
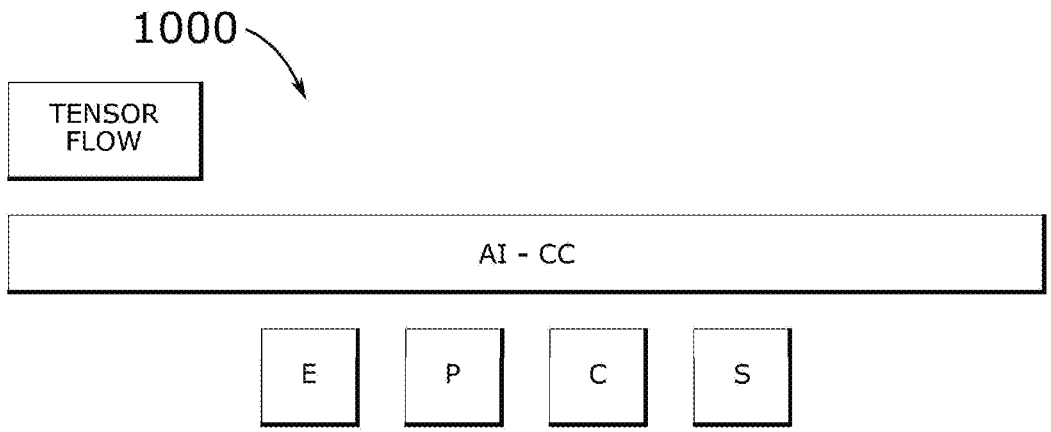
FIG. 10 conceptually illustrates an artificial intelligence (AI) resource block diagram in which AI is treated as a resource derived from other resources in some embodiments.

In yet another usage example, FIG. 10 conceptually illustrates an artificial intelligence (AI) block diagram 1000 in which AI is treated as a resource derived from other resources such as energy (E), processing (P), communication (C), and storage (S), and in which computational capacity (CC) quantifies the AI capacity of the system based on dependent variables for certain classes of problems. Also shown in the AI and CC resource block diagram 1000 is a TensorFlow software platform that is a widely adopted, open source, machine learning software platform that runs on the nodes.

Figure 13:
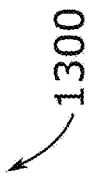
FIG. 13 conceptually illustrates an example of three nodes sharing processing resources in a cluster of nodes in some embodiments.

While the processing resource block diagram 800, the communications resource block diagram 900, and the artificial intelligence (AI) block diagram 1000 demonstrate high level examples of using local and shared processing, communications, and AI resources, other examples demonstrate how one may use the system to optimize allocation and usage of resources, goods, and services among nodes in a cluster of nodes, including an example of three nodes sharing processing resources, described in detail below by reference to FIG. 13.

Figure 11:
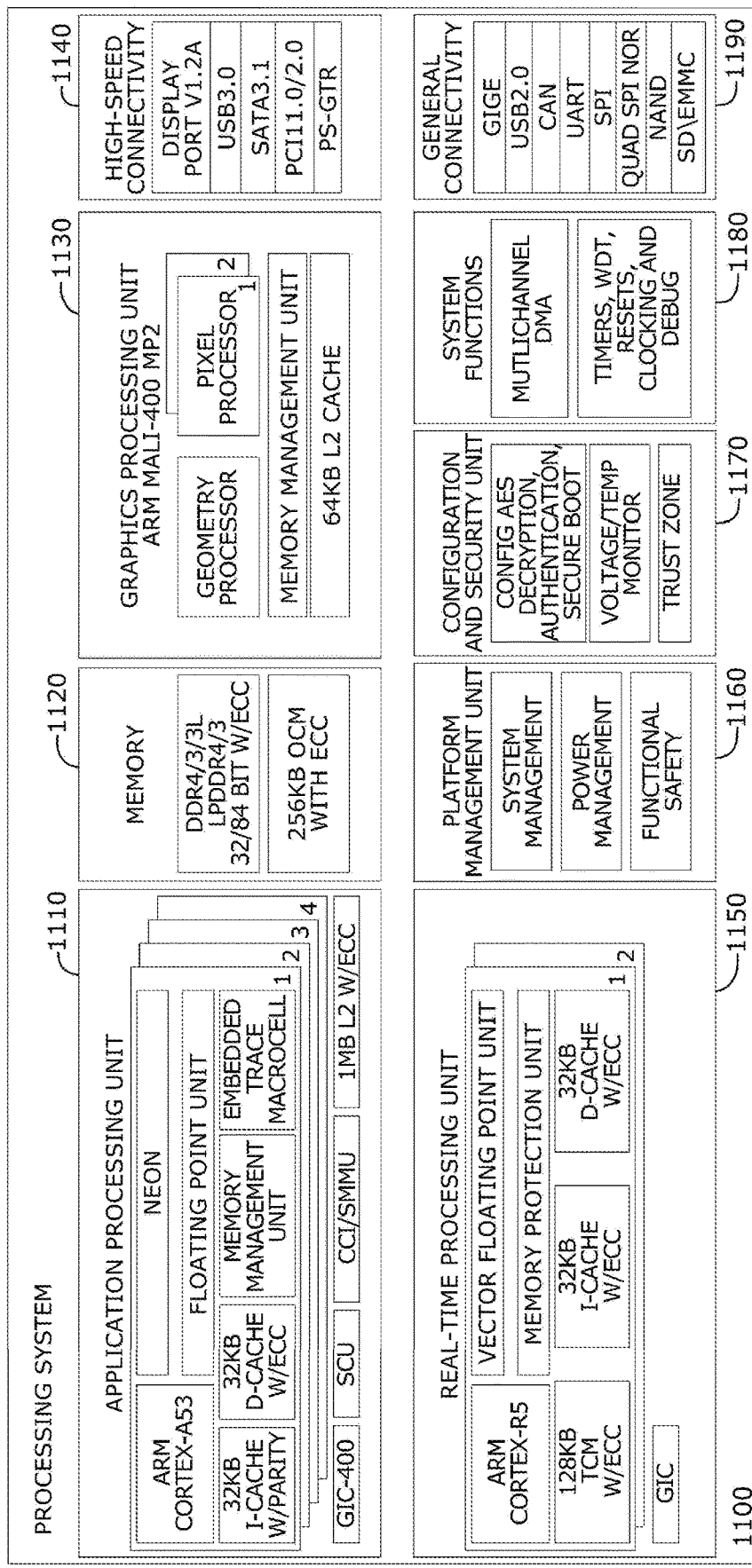
FIG. 11 conceptually illustrates a block diagram of a processing system of an exemplary node of the system to optimize allocation and usage of resources, goods, and services among nodes in a cluster of nodes in some embodiments.

The physical hardware node described above by reference to FIG. 4 is a node that includes an expansive processing system with several components, devices, modules, and other node functional elements to allow the node to sufficiently share resources, goods, and services among the cluster of nodes. By way of example, FIG. 11 conceptually illustrates a block diagram of a processing system 1100 (or node processing system 1100) of an exemplary node of the system to optimize allocation and usage of resources, goods, and services among nodes in a cluster of nodes in some embodiments. As shown in this figure, the node processing system 1100 includes an application processing unit 1110, memory 1120, a graphics processing unit 1130, high-speed connectivity interfaces and ports 1140, a real-time processing unit 1150, a platform management unit 1160, a configuration and security unit 1170, system functional elements 1180, and general connectivity interfaces and ports 1190.

In particular, the application processing unit 1110 of the node processing system 1100 includes an ARM Cortex-A53 processing unit, a NEON module, a floating point computation unit, 32 KB of i-cache with parity, 32 KB of d-cache with ECC, a memory management unit, and an embedded trace macrocell. In addition, the application processing unit 1110 also includes GIC-400, SCU, CCI/SMMU, and 1 MB L2 memory with ECC.

The memory 1120 of the node processing system 1100 includes DDR4/3/3L LPDDR4/3 32/84 bit memory with ECC and 256 KB OCM with ECC.

The graphics processing unit 1130 of the node processing system 1100 is an ARM Mali-400 MP2 graphics processing unit 1130, which includes a geometry processor, a pair of pixel processors, a memory management unit, and 64 KB L2 cache memory.

The high-speed connectivity interfaces and ports 1140 of the node processing system 1100 include a display port v1.2A, a USB 3.0 interface, a SATA 3.1 interface, a PCI 11.0/2.0 interface, and a PS-GTR interface.

The real-time processing unit 1150 of the node processing system 1100 includes two layers processing components for multi-threading and simultaneous or contemporaneous real-time processing (a first real-time processing layer 1 and a second real-time processing layer 2) and a GIC unit. Each of the first real-time processing layer 1 and the second real-time processing layer 2 include an ARM Cortex-R5 processor, 128 KB TCM with ECC, a vector floating point computation unit, a memory protection unit, 32 KB i-cache with ECC, and 32 KB D-cache with ECC.

The platform management unit 1160 of the node processing system 1100 includes a systems management module, a power management sub-system, and functional safety protocols, modules, units, and devices.

The configuration and security unit 1170 of the node processing system 1100 includes configuration of AES and AES decryption, authentication modules, secure boot sectors and units, voltage and temperature monitors, and a trust zone manager.

The system functional elements 1180 of the node processing system 1100 include multichannel DMA, timers, WDT, resets, a clocking device, and debug units.

The general connectivity interfaces and ports 1190 of the node processing system 1100 include a GIGE interface, a USB 2.0 interface, a CAN interface and bus, a UART interface, an SPI interface, a quad SPI NOR gate, a NAND gate, and an SD\EMMC unit.

Figure 12:
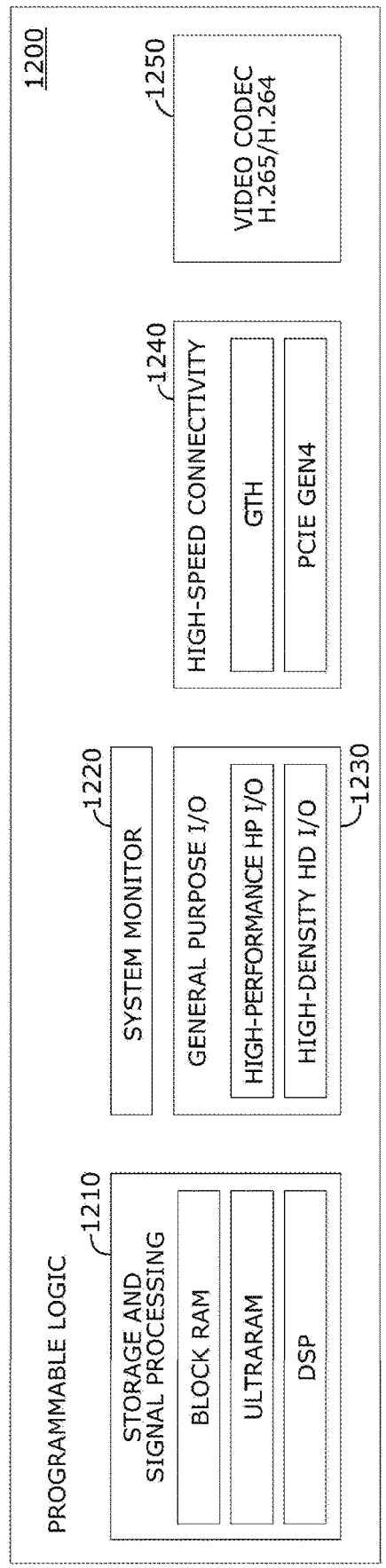
FIG. 12 conceptually illustrates a block diagram of a programmable logic unit of an exemplary node of the system to optimize allocation and usage of resources, goods, and services among nodes in a cluster of nodes in some embodiments.

FIG. 12 conceptually illustrates a block diagram of a programmable logic unit 1200 of an exemplary node of the system to optimize allocation and usage of resources, goods, and services among nodes in a cluster of nodes in some embodiments. As shown in this figure, the programmable logic unit 1200 includes storage and signal processing logic unit 1210, a systems monitor 1120, general purpose input/output (I/O) system 1230, high-speed connectivity 1240, and video codecs 1250. The storage and signal processing logic unit 1210 includes block RAM, ultraRAM, and DSP. The general purpose I/O system 1230 includes high-performance (HP) I/O and high-density (HD) I/O. The high-speed connectivity includes GTH and PCIE GEN4. The video codecs 1250 include H.264 and H.265.

Now turning to a usage example, FIG. 13 conceptually illustrates an example resource allocation table 1300 of three nodes sharing processing resources. As shown in this figure, three nodes $N_1$, $N_2$, and $N_3$ share processing resources with processing rates of 1 Teraflop per second (TFlps), 2 TFlps, and 3 TFlps, respectively. The physical positioning in the nodes $N_1$, $N_2$, and $N_3$ in the SOS network is such that they can be understood as being at the vertices of a right triangle with sides of 300 km, 400 km, and 500 km in length. Specifically, the segment between $N_1$ and $N_2$ is 300 km, the segment between $N_1$ and $N_3$ is 400 km, and the segment between $N_2$ and $N_3$ is 500 km. In this example, a time step, $\Delta T$, is set at ten minutes (10'). As described above by reference to FIG. 5, the method for optimal and transparent exchange of resources, goods, and services among nodes in a cluster of nodes 500 would repeat the loop at each time step, such that the resource manager (ROME) 540 could update the resource allocation table 1300 among the nodes. In this example the time step, $\Delta T$, is ten minutes, with six resource allocation columns at time steps $\Delta T1$-$\Delta T6$. The maximum processing that could possibly be shared by each node during each time interval, $\Delta T$, is 600 TFlps for node $N_1$, 1200 TFlps for node $N_2$, and 1800 TFlps for node $N_3$. Also assume that for this example there is an initial assignment of certificates of contribution (CCs) that is approximately equivalent to three full days of processing. Thus, upon joining the SOS network, node $N_1$ would receive approximately 250,000 CCs, node $N_2$ would receive approximately 500,000 CCs, and node $N_3$ would receive approximately 750,000 CCs.

As shown by the relative CC values in the resource allocation table 1300 shown in FIG. 13, the total processing over six time steps at ten minute intervals is made. Specifically, at the beginning of a time interval, e.g., $\Delta T2$, each node has certain processing requirements for the coming ten minute interval. In this particular example, as shown in the resource allocation table 1300 of FIG. 13, the processing requirements for the interval are 300, 600 and 2,300 Teraflop for node $N_1$, node $N_2$, and node $N_3$. Given that the maximum processing capacity of nodes in ten minutes time is 600, 1,200 and 1,800 Teraflops, node $N_3$ needs an additional of 500 Teraflops while node $N_1$ and node $N_2$ have an unused capacity of 300 and 600 Teraflops, respectively. This is the balance of the node.

Nodes, such as the three nodes $N_1$, $N_2$, and $N_3$, advertise their excess or needed resources. In this way, the resource manager (ROME) schedules node $N_2$ to share 500 Teraflop of its excess resources with node $N_3$. As a result of this resource exchange, the distributed ledger (certificate counter) assigns 500 CC to node $N_2$. The selection of resources from node $N_2$ instead of node $N_1$ is due to the assignment algorithm which prioritizes nodes closer to the requesting node, which additionally, have all requested resources.

As the number of nodes of the system increases, total system and nodes efficiencies grow monotonically and approach to their maximum allowed values (in the example of above, in every time period of ten minutes, 600 Teraflop 1,200 Teraflop and 1,800 Teraflop for nodes $N_1$, $N_2$, and $N_3$, respectively, and 3,600 Teraflop for the full system). Thus, resources are used to their best potential as the number of nodes increases. Additionally, the number of CCs grows unbounded as nodes are added to the system, and/or more resources are added to current nodes of the system.

Looking at the required, balance, and needed amounts across the resource allocation table 1300 and across the different times, it is shown that the sharing scheme has resulted in an increase of the efficiency of the system of about 40%, from a total of 14,500 Teraflop to 20,500 Teraflop. More specifically to the point, at $\Delta T1$ there is a total of 3000 TFlps not shared and a total of 3600 shared TFlps, at $\Delta T2$ there is a total of 2700 TFlps not shared and a total of 3200 shared TFlps, at $\Delta T3$ there is a total of 2300 TFlps not shared and a total of 3200 shared TFlps, at $\Delta T4$ there is a total of 2000 TFlps not shared and a total of 3300 shared TFlps, at $\Delta T5$ there is a total of 2600 TFlps not shared and a total of 3600 shared TFlps, at $\Delta T6$ there is a total of 1900 TFlps not shared and a total of 3600 shared TFlps. Overall, the total TFlps over time steps $\Delta T1$-$\Delta T6$ that are non-shared is 14,500, while the total TFlps over time steps $\Delta T1$-$\Delta T6$ that are shared is 20,500. Thus, using the system to optimize allocation and usage of resources, goods, and services among nodes in a cluster of nodes can be understood as an approach to a more perfect market.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, while a preferred embodiment of the invention focuses on the global space industry, in some embodiments, the system and network (and method) are used in other industries or verticals for efficient sharing of resources and services among various stakeholders. Also, adaptations can be made to some embodiments to further provide other similar systems including software, hardware, communication for optimal sharing of resources and services in IoT systems in space and industry, and for diverse applications such as logistic, resource management smart city, etc.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when implemented in the software layer of (above the hardware layer shown in the node architecture described above by reference to FIG. 2) to operate on one or more nodes in the cluster of nodes on the SOS network, define one or more specific machine implementations that execute and perform the operations of the software programs.

Figure 14:
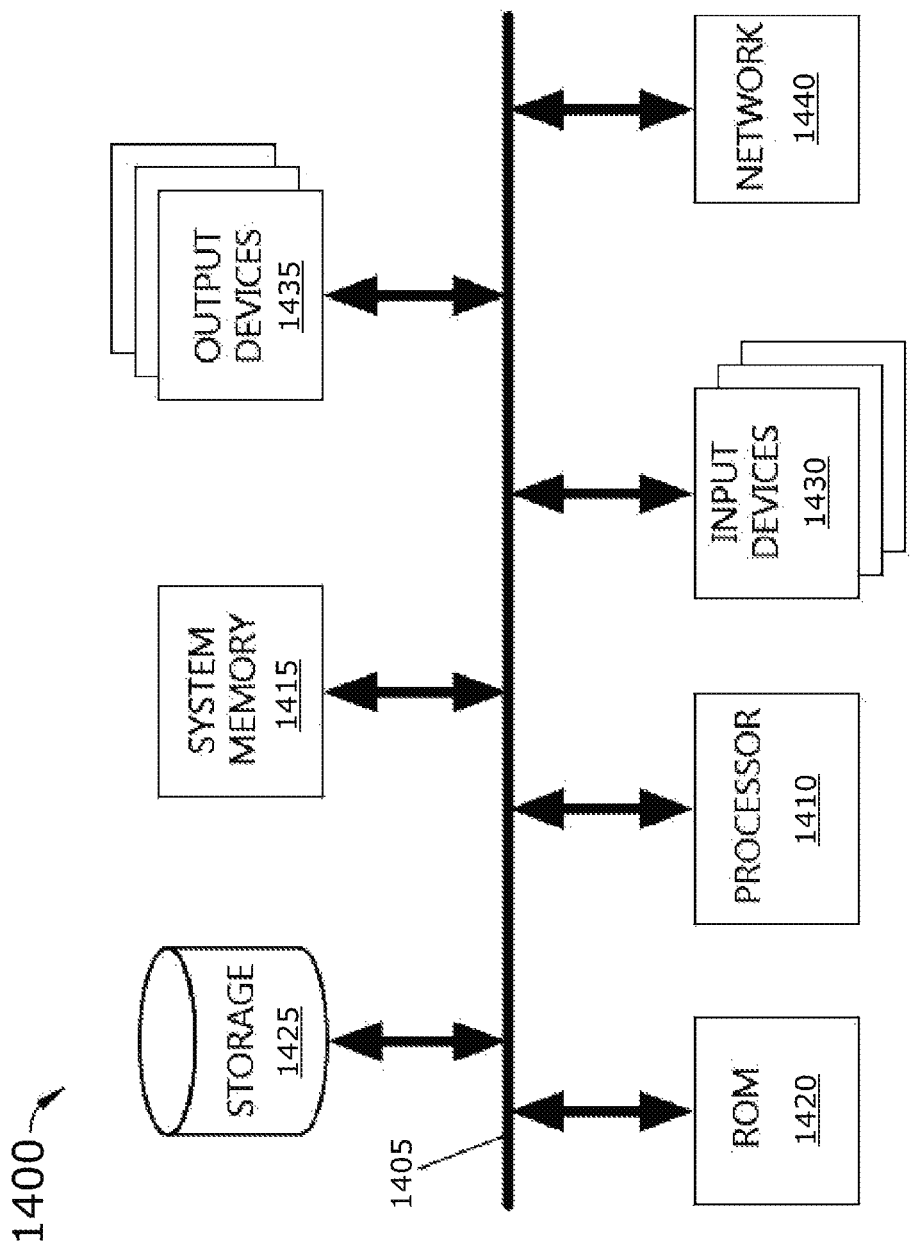
FIG. 14 conceptually illustrates an electronic system with which some embodiments of the invention are implemented.

By way of example, FIG. 14 conceptually illustrates an electronic system 1400 with which some embodiments of the invention are implemented. The electronic system 1400 may be a ground station node computing device, a space satellite node computing device, a computer that entered the SOS network, a phone, a tablet computing device, a smartphone mobile device, or any other sort of electronic device with at least one resource to share out of the communication resource, the processing power resource, the energy resource, and the storage resource. Such an electronic system includes various types of computer readable media and interfaces for various other types of computer readable media. Electronic system 1400 includes a bus 1405, processing unit(s) 1410, a system memory 1415, a read-only 1420, a permanent storage device 1425, input devices 1430, output devices 1435, and a network 1440, such as the SOS network.

The bus 1405 collectively represents all system, peripheral, and chipset buses that communicatively connect the numerous internal devices of the electronic system 1400. For instance, the bus 1405 communicatively connects the processing unit(s) 1410 with the read-only 1420, the system memory 1415, and the permanent storage device 1425 (local storage).

From these various memory units, the processing unit(s) 1410 retrieves instructions to execute and data to process in order to execute the processes of the invention. The processing unit(s) may be a single processor or a multi-core processor in different embodiments.

The read-only-memory (ROM) 1420 stores static data and instructions that are needed by the processing unit(s) 1410 and other modules of the electronic system. The permanent storage device 1425, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1425.

Other embodiments use a removable storage device (such as a floppy disk or a flash drive) as the permanent storage device 1425. Like the permanent storage device 1425, the system memory 1415 is a read-and-write memory device. However, unlike storage device 1425, the system memory 1415 is a volatile read-and-write memory, such as a random access memory. The system memory 1415 stores some of the instructions and data that the processor needs at runtime. In some embodiments, the invention's processes are stored in the system memory 1415, the permanent storage device 1425, and/or the read-only 1420. For example, the various memory units include instructions for processing appearance alterations of displayable characters in accordance with some embodiments. From these various memory units, the processing unit(s) 1410 retrieves instructions to execute and data to process in order to execute the processes of some embodiments.

The bus 1405 also connects to the input and output devices 1430 and 1435. The input devices enable the user to communicate information and select commands to the electronic system. The input devices 1430 include alphanumeric keyboards and pointing devices (also called "cursor control devices"). The output devices 1435 display images generated by the electronic system 1400. The output devices 1435 include printers and display devices, such as cathode ray tubes (CRT), liquid crystal displays (LCD), or organic light emitting diode (OLED) displays. Some embodiments include devices such as a touchscreen that functions as both input and output devices.

Finally, as shown in FIG. 14, bus 1405 also couples electronic system 1400 to a network 1440 through a network adapter (not shown). In this manner, the computer can be a part of a network of computers (such as a local area network ("LAN"), a wide area network ("WAN"), a space operating system (SOS) network, or an intranet), or a network of networks (such as the Internet or multiple joined clusters that form a single larger cluster). Any or all components of electronic system 1400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 5 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A system to optimize allocation and usage of resources, goods, and services among nodes in a cluster of nodes, said system comprising:
   a plurality of nodes for prosumers of resources and services for space communications, wherein prosumers comprise producers and consumers;
   a distributed space operating system that is configured to manage resources and services at nodes entered into a cluster of nodes;
   a blockchain implementation of a distributed ledger that is used to build a distributed smart system of nodes which are configured to transparently exchange resources and services between the nodes entered into the cluster of nodes, wherein the distributed ledger records resource and service exchanges between nodes as blockchain transactions;
   a plurality of tokens that are quantified for the exchange of resources and services among the nodes in the cluster of nodes;
   internal certificates that are assigned to nodes entered into the cluster of nodes; and
   an API layer of the distributed space operating system that provides access to communication space protocols.

2. The system of claim 1, wherein the distributed space operating system is further configured to manage communication with things including other nodes, machines, devices, robots, and people.

3. The system of claim 1, wherein the distributed space operating system is configured to provide scalable storage, a processing grid, a virtual network, and shared communication capabilities.

4. The system of claim 1, wherein the resources and services comprise processing power, communications, storage, and energy.

5. The system of claim 1, wherein the plurality of tokens are quantified according to time-based unit measurements of resources and services.

6. The system of claim 5, wherein unit measurements are denoted in tokens for each type of resource and service.

7. The system of claim 1, wherein the internal certificates are assigned and issued to each node entered into the cluster of nodes for the amount of shared resources or services provided.

8. The system of claim 1, wherein the communication space protocols comprise CubeSat Space Protocol (CubeSat) and the Consultative Committee for Space Data Systems (CCSDS).

9. The system of claim 1, wherein there is no arbitrary limit on amount of tokens in the system as the network is expected to grow.

\* \* \* \* \*